United States Patent
Kim et al.

(10) Patent No.: US 7,643,012 B2
(45) Date of Patent: Jan. 5, 2010

(54) TERMINAL AND METHOD FOR SELECTING DISPLAYED ITEMS

(75) Inventors: Tae Hun Kim, Incheon-si (KR); Boem Young Woo, Gyeonggi-do (KR); Jeong Hyuk Yoon, Seoul (KR); Hyun Ju Ahn, Seoul (KR); Seung Sook Han, Gyeonggi-do (KR); Jun Serk Park, Seoul (KR); Ho Sang Cheon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/691,305

(22) Filed: Mar. 26, 2007

(65) Prior Publication Data
US 2007/0229471 A1   Oct. 4, 2007

(30) Foreign Application Priority Data
Mar. 30, 2006   (KR) .................. 10-2006-0028977

(51) Int. Cl.
G06F 3/41   (2006.01)
(52) U.S. Cl. ....................... 345/173; 345/178
(58) Field of Classification Search .............. 345/87, 345/156–159, 162–169, 173–179, 9, 419, 345/473, 716, 902; 178/18.01–20.01; 348/169, 348/239, 211.8, 333.02; 715/722, 863, 823, 715/862, 856; 386/46
See application file for complete search history.

(56) References Cited

U.S. PATENT DOCUMENTS

| | | | | | |
|---|---|---|---|---|---|
| 5,396,287 | A | * | 3/1995 | Cho | 348/211.8 |
| 5,488,204 | A | * | 1/1996 | Mead et al. | 178/18.06 |
| 5,694,142 | A | * | 12/1997 | Dumoulin et al. | 345/9 |
| 5,699,089 | A | * | 12/1997 | Murray | 715/823 |
| 5,724,531 | A | * | 3/1998 | Miyashita et al. | 715/862 |
| 6,211,856 | B1 | * | 4/2001 | Choi et al. | 345/666 |
| 6,295,052 | B1 | * | 9/2001 | Kato et al. | 345/179 |
| 6,943,779 | B2 | * | 9/2005 | Satoh | 345/173 |
| 7,027,055 | B2 | * | 4/2006 | Anderson et al. | 345/473 |
| 7,176,904 | B2 | * | 2/2007 | Satoh | 345/173 |
| 7,250,944 | B2 | * | 7/2007 | Anderson et al. | 345/419 |
| 7,386,484 | B1 | * | 6/2008 | Cuzzocrea | 705/26 |
| 7,447,418 | B2 | * | 11/2008 | Nishio et al. | 386/46 |
| 2002/0104582 | A1 | * | 8/2002 | Kanamori et al. | 141/104 |
| 2002/0145595 | A1 | * | 10/2002 | Satoh | 345/173 |

(Continued)

FOREIGN PATENT DOCUMENTS

WO   WO 2005/114369 A2   12/2005

Primary Examiner—Prabodh M Dharia
(74) Attorney, Agent, or Firm—Lee, Hong, Degerman, Kang & Waimey

(57) ABSTRACT

A terminal and method for selecting an item displayed on a touch screen are disclosed. The method for selecting an item displayed on the screen includes simultaneously touching the screen at two or more locations to define a selection area and identifying the items within the selection area. The section area may be a rectangle, a horizontal or vertical band of the display, a circle, or sequentially arranged items of a list. Alternatively, a single touch may define a point in the display area and the bounds of the display area are defined by the time the touch is maintained. Recently, with the increasing development of multiple functions on a single terminal, the method can be conveniently applied to the latest terminal where associated items are simultaneously displayed on a single display screen of the terminal.

12 Claims, 18 Drawing Sheets

U.S. PATENT DOCUMENTS

| | | | |
|---|---|---|---|
| 2003/0090504 A1* | 5/2003 | Brook et al. | 345/716 |
| 2004/0119763 A1 | 6/2004 | Mizobuchi et al. | |
| 2004/0145663 A1* | 7/2004 | Nishio et al. | 348/239 |
| 2004/0239763 A1* | 12/2004 | Notea et al. | 348/169 |
| 2005/0264541 A1* | 12/2005 | Satoh | 345/173 |
| 2006/0022956 A1* | 2/2006 | Lengeling et al. | 345/173 |
| 2006/0026535 A1* | 2/2006 | Hotelling et al. | 715/863 |
| 2007/0097096 A1* | 5/2007 | Rosenberg | 345/173 |
| 2007/0229465 A1* | 10/2007 | Sakai et al. | 345/173 |
| 2008/0109729 A1* | 5/2008 | Notea et al. | 715/722 |

* cited by examiner

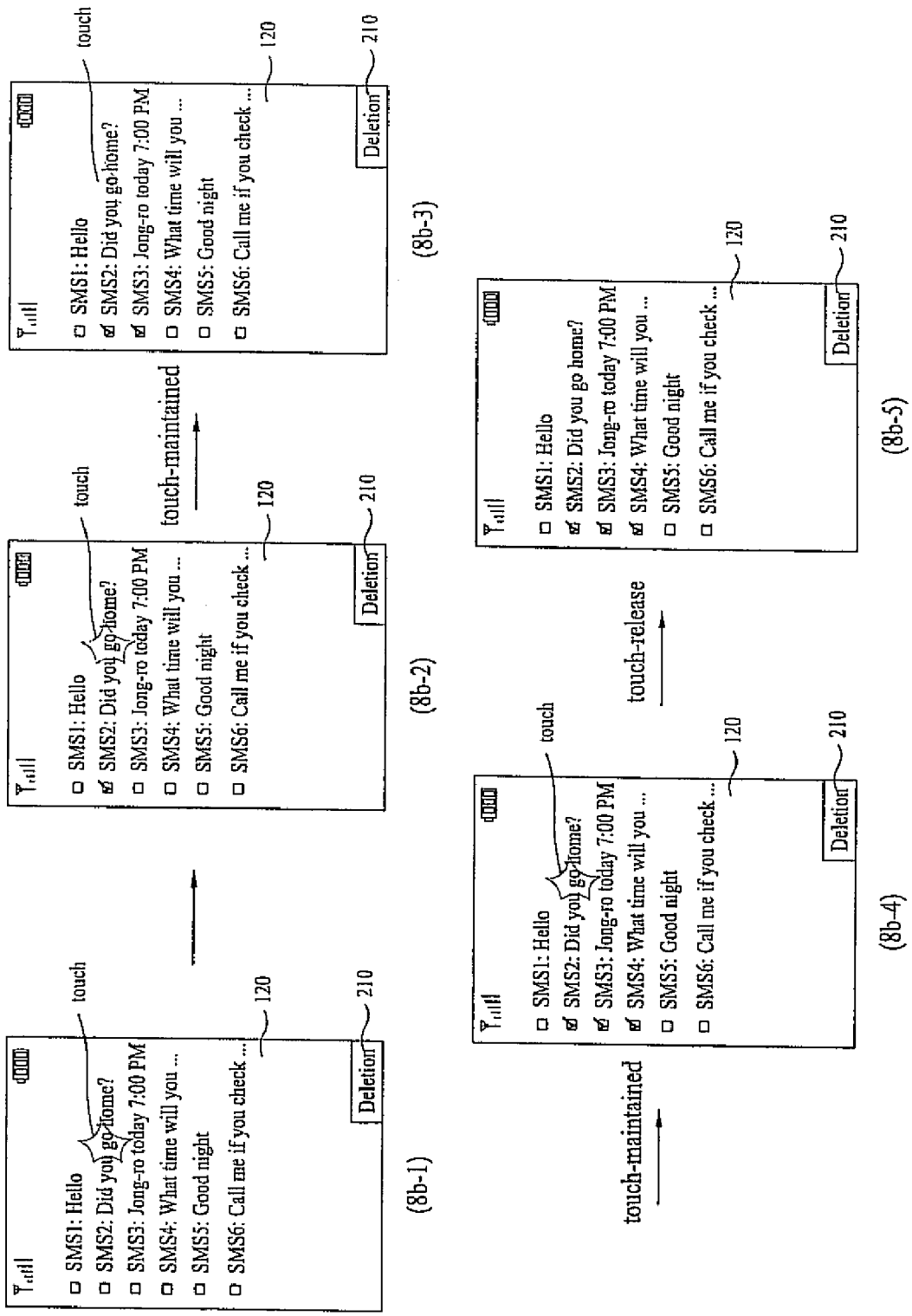

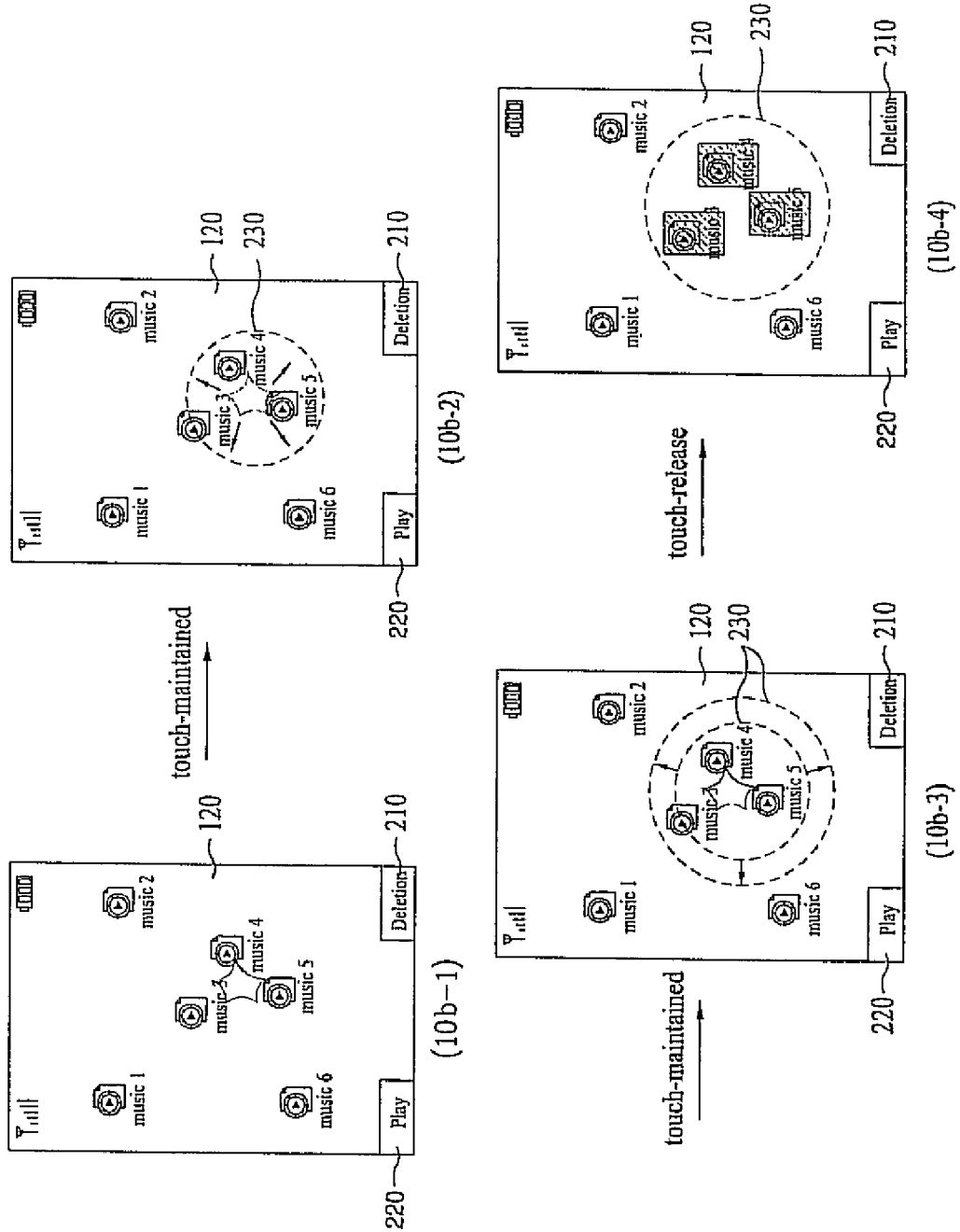

TERMINAL AND METHOD FOR SELECTING DISPLAYED ITEMS

CROSS REFERENCE TO RELATED APPLICATION

This application claims the benefit of Korean Patent Application No. 10-2006-0028977, filed on Mar. 30, 2006, which is hereby incorporated by reference as if fully set forth herein.

BACKGROUND OF THE INVENTION

1. Field of the Invention

The present invention relates to a terminal and method for selecting an item displayed on a screen.

2. Discussion of the Related Art

In recent times, with the increasing development of information communication technologies, information and communication environments have changed. Particularly, a kiosk (an automated information terminal) installed at public places, such as governmental offices, banks, department stores, and exhibition rooms is considered a requisite for modern society and is widely used throughout the world.

In addition, mobile communication terminals are also considered requisites for modern society and are widely used throughout the world.

Recently, with the increasing use of a variety of functions on a single terminal, elements capable of performing a variety of functions have been added to the single terminal. Therefore, there are many cases where a variety of items (i.e., icons) relating to the above-mentioned functions are simultaneously displayed on a single screen.

SUMMARY OF THE INVENTION

Accordingly, the present invention is directed to a terminal and method for selecting an item displayed on a screen that substantially obviates one or more problems due to limitations and disadvantages of the related art.

An object of the present invention is to provide terminal and method for selecting items allowing a user to quickly and conveniently select one or more items when several items are displayed on a terminal screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for selecting icons on a screen having a vertical axis and a horizontal axis comprising: defining a selection area on the screen by touching an input device; and selecting the icons that are at least partially within the selection area, wherein the input device is one of a touch screen and a touch pad.

Defining the selection area may be accomplished in several methods. A first method comprises touching the input device to locate the center of a circle; maintaining the touch for a period of time; and releasing the touch, wherein the circle has a radius according to the period of time the touch is maintained, and wherein the selection area is defined by the circle.

Another method for defining the selection area comprises touching the input device to locate a first point; while maintaining the touch locating the first point, touching the input device to locate a second point; and releasing the touches locating the first and second points. If the first point and the second point lie on a line parallel to the horizontal axis, the selection area is a vertical band located between the first and the second points. If the first point and the second point lie on a line parallel to the vertical axis, the selection area is a horizontal band located between the first and the second points. If the first point and the second point line lie on a line that is not parallel to the vertical or horizontal axes, the first point and the second point define opposing corners of a rectangle having sides parallel to the vertical and horizontal axes, and wherein the selection area is defined by the rectangle.

Still another method for defining the selection area comprises touching the input device to locate a first point, while maintaining the touch locating the first point, touching the input device to locate a plurality of additional points, and releasing the touches locating the first point and the plurality of additional points. The first point and the plurality of additional points define the vertices of a closed polygon, and the closed polygon defines the selection area.

In another aspect of the present invention, a terminal is provided comprising: an input unit; a screen having a vertical and a horizontal axis for displaying icons; and a controller for defining a selection area of the screen and for selecting icons that are located at least partially within the selection area, wherein the input device is one of a touch screen and a touch pad. The selection area is a circle having a center located by a touch on the input unit and a radius according to a period of time the touch is maintained.

Alternatively, the selection area is defined by a first point and a second point, the first point located by a first touch of the input device, and the second point located by a second touch of the input device while maintaining the first touch. If the first point and the second point lie on a line parallel to the horizontal axis, the selection area is a vertical band located between the first and the second points. If the first point and the second point lie on a line parallel to the vertical axis, the selection area is a horizontal band located between the first and the second points. If the first point and the second point line lie on a line that is not parallel to the vertical or horizontal axes, the first point and the second point define opposing corners of a rectangle having sides parallel to the vertical and horizontal axes, and wherein the selection area is defined by the rectangle.

Yet another aspect of the invention is a terminal comprising: an input unit; a screen displaying a list of items; and a controller for selecting items, wherein a first touch of the input devices identifies a first item of the list and a second touch of the input device while maintaining the first touch identifies a second item of the list, wherein when the first touch and the second touch are released, the first item and the second item, and all items therebetween are selected.

Still another aspect of the invention is a terminal comprising: an input unit; a screen displaying a list of items; and a controller for selecting items, wherein a first touch of the input device selects a first item and sequential items are selected while the first touch is maintained.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description, serve to explain the principle of the invention. In the drawings:

FIGS. 8A~8D show display images of a mobile terminal associated with an item selection method according to a fourth embodiment of the present invention;

FIGS. 10A~10D show display images of a mobile terminal associated with an item selection method according to a fifth embodiment of the present invention.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

It should be noted that the present invention can be applied to mobile terminals (e.g., mobile phones, PDAs, and game machines) and kiosk terminals (e.g., ATMs).

However, for the convenience of description and better understanding of the present invention, it is assumed that the present invention is applied to mobile terminals such as mobile phones. Therefore, it should be noted that the scope of the present invention is not limited to the following explanation and embodiments and can be applied to other examples as necessary.

Figure 1:
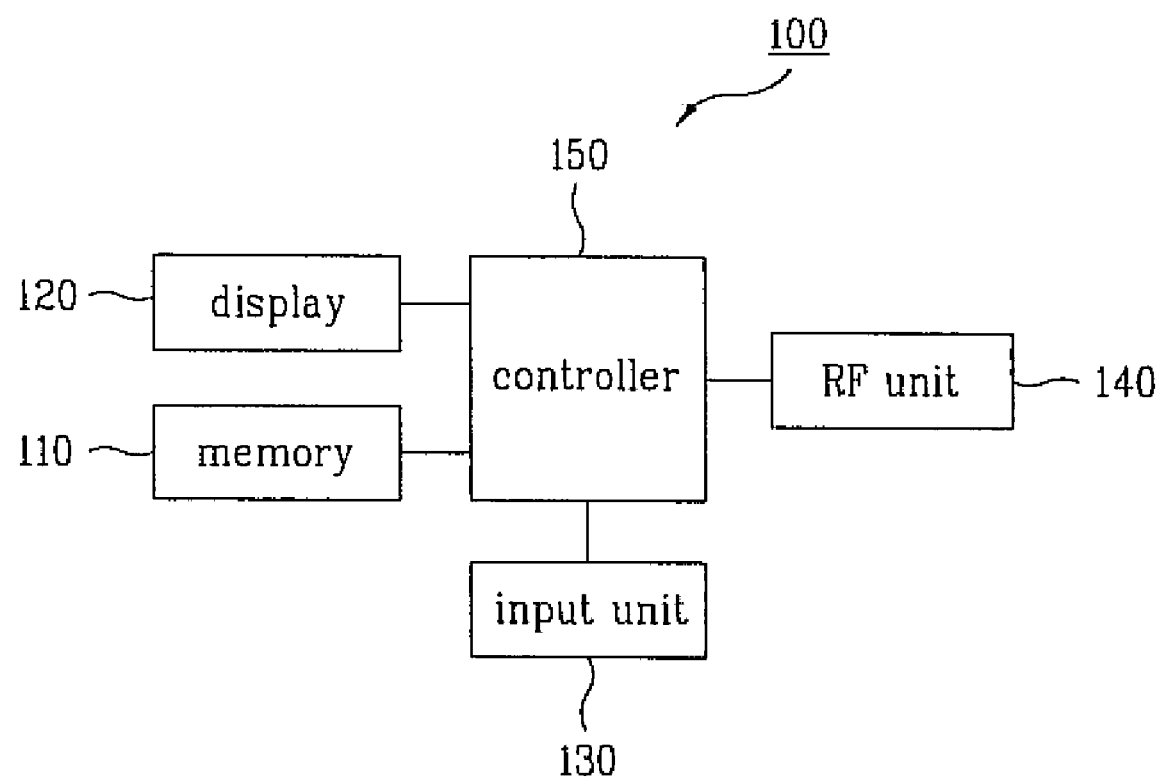
FIG. 1 is a block diagram illustrating a mobile terminal according to the present invention.

FIG. 1 is a block diagram illustrating a mobile terminal according to the present invention.

Referring to FIG. 1, the mobile terminal 100, according to the present invention, includes a memory unit 110, a display 120, an input unit 130, a Radio Frequency (RF) unit 140, and a controller 150.

The mobile terminal 100 may include not only the above-mentioned constituent components but also other components; however, the other components are not directly associated with the present invention, such that a detailed description will be omitted for convenience, The memory unit 110 includes software programs for executing a plurality of functions provided by the mobile terminal 100 and associated data (e.g., an MP3 file, an image file, a document file, a list of phone-numbers, a list of calls, a list of SMS messages, a list of E-mails, and a list of MMS (Multimedia Message Service) messages).

The display 120 may display a variety of icons (e.g., an MP3-file icon, an image-file icon, a document-file icon, and a program-execution icon) for executing a variety of functions. Also, the display 120 may display a list of phone numbers, a list of calls, and a list of SMS messages, etc.

For the convenience of description, each of the icons or each of the lists is generically called an "item".

Preferably, an item displayed on the touch-screen may be directly selected by a user who touches the touch-screen.

Preferably, the display 120 may be configured in the form of a touch-screen. The touch-screen may be configured by at least one of an electrostatic capacitive, a resistive overlay, an infrared beam, a surface acoustic wave, an integral strain gauge, and a piezo-electric method.

However, the following item selection method can be conveniently implemented by the user who uses his or her fingers to operate a touch screen. Therefore, the present invention assumes that the display 120 is indicative of the touch-screen.

The input unit 130 allows the user to enter a variety of commands or information in the mobile terminal 100. The input unit 130 is a requisite for the mobile terminal 100 if the display 120 is not implemented with the touch-screen. Otherwise, if the display 120 is implemented with the touch-screen, the input unit 130 can be selectively contained in the mobile terminal 100. The input unit 130 may also be a keypad, a touch-wheel, a touch-pad, or a voice recognition device.

The RF unit 140 processes a variety of RF signals to allow the mobile terminal 100 to communicate with a communication system using voice-call service or SMS service.

The controller 150 controls all operations of the terminal including the memory unit 110, the display 120, the input unit 130, and the RF unit 140. Particularly, the controller 150 controls the item selection method to be implemented in the mobile terminal 100.

Embodiments of the item selection method for use in the terminal will be described.

A first embodiment of the present invention will be described with reference to FIGS. 2A~2D and 3.

Figure 2A:
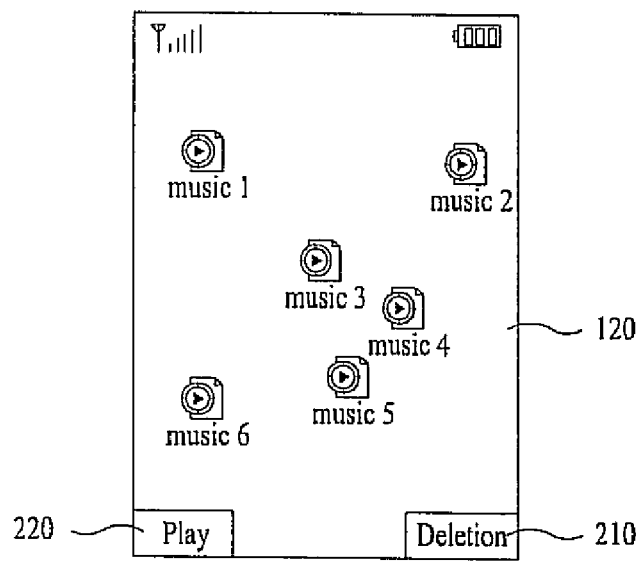
FIGS. 2A~2D show display images of a mobile terminal associated with an item selection method according to a first embodiment of the present invention.

FIGS. 2A~2D show display images of a mobile terminal associated with an item selection method according to a first embodiment of the present invention. FIG. 3 is a flow chart illustrating an item selection method according to a first embodiment of the present invention. A plurality of MP3 music file icons are displayed on the display of the mobile terminal as shown in FIG. 2A.

A method for conveniently selecting a few icons (i.e., "Music 3" icon, "Music 4" icon, and "Music 5" icon) from among the icons according to the first embodiment of the present invention while the icons are displayed on the display of the mobile terminal will be described.

It should be noted that there is no need for the icons to be MP3 music file icons in the first and other embodiments, and the icons may also be items associated with image or document files as necessary.

Figure 2B:
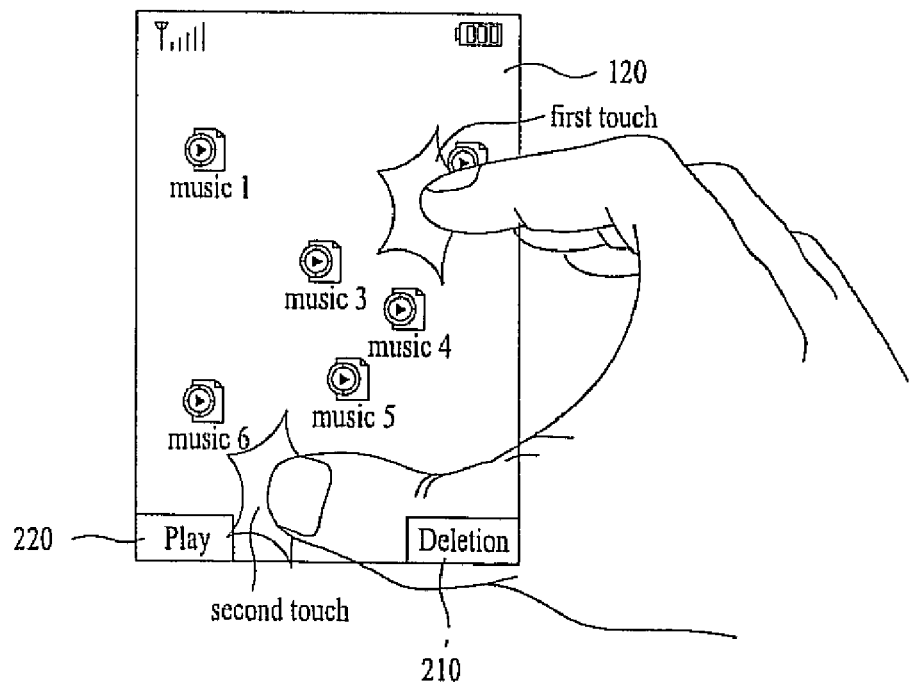
Figure 3:
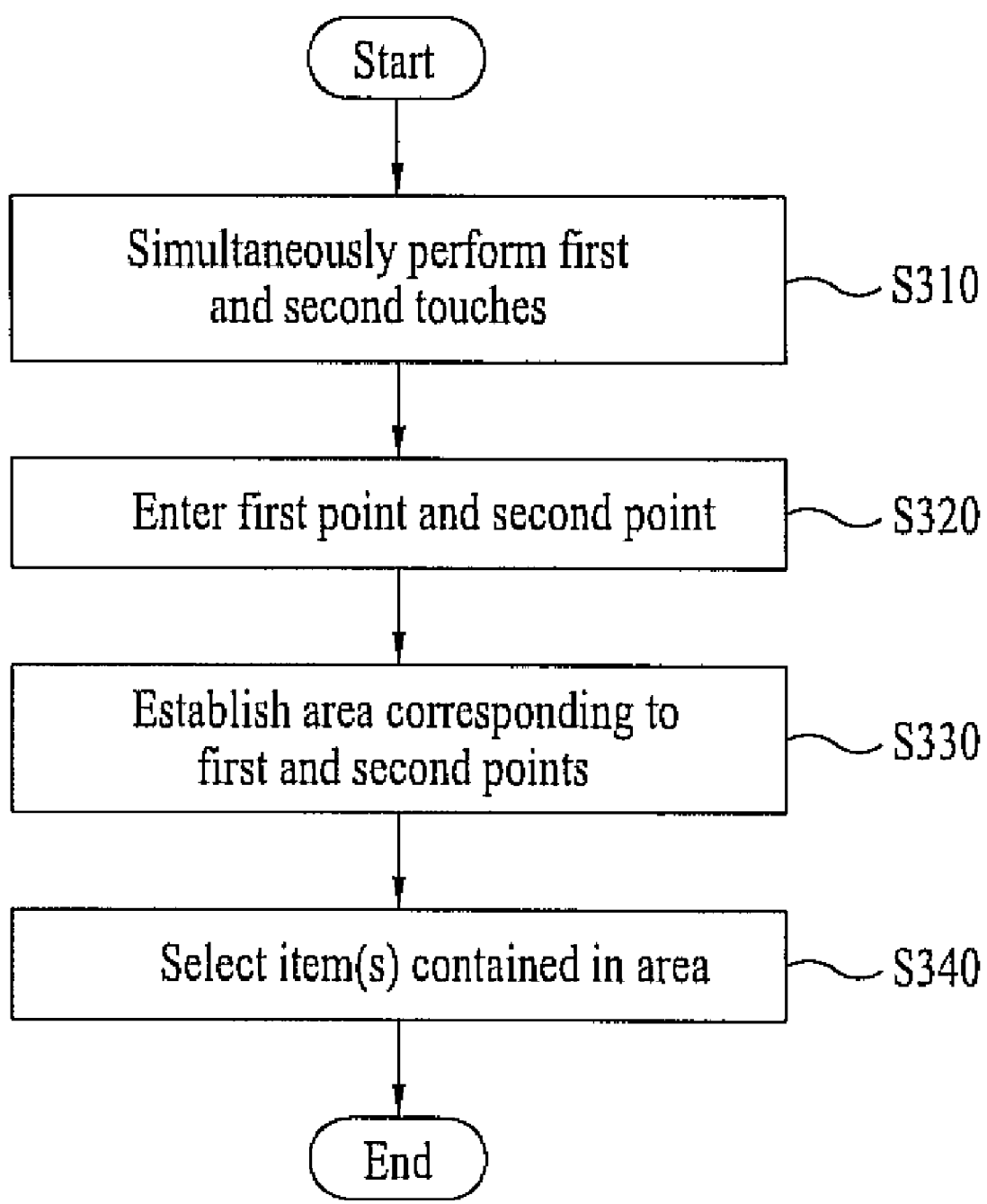
FIG. 3 is a flow chart illustrating an item selection method according to a first embodiment of the present invention.

As shown in FIG. 2B, the user simultaneously performs a first touch and a second touch at desired places on the touch-screen of the display 120 shown in FIG. 3 at step S310.

In this case, it should be noted that the simultaneous performance of the first and second touch does not indicate that the beginning and end times of the first and second touch performances must be identical with each other.

According to the present invention (including this and other embodiments), it is considered that the first touch and the second touch are simultaneously performed if the user performs the second touch while the first touch is not yet ended even though the first touch begins earlier than the second touch.

In other words, if both of the first touch and second touch performed by the user are in contact with the touch screen 120 at a specific moment, it is considered that the first touch and the second touch are simultaneously performed. Likewise, the operation is also applied to the other case where the second touch begins earlier than the first touch.

Figure 2C:
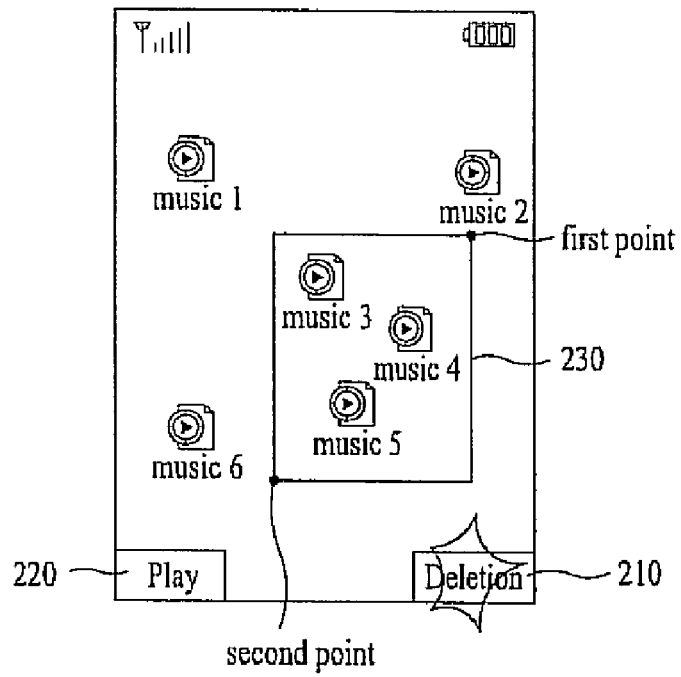

If the first touch and the second touch are simultaneously performed on the touch-screen 120, a first point corresponding to the first touch and a second point corresponding to the second touch are entered from the touch-screen 120 as shown in FIG. 2C at step S320. Then, an area 230 defined by the first and second points is established at step S330.

Preferably, the defined area 230 may be configured in the form of a rectangle having the first and second points as opposing corners, as shown in FIG. 2C.

Area 230 may be configured in the form of a closed curve. For example, the area 230 may be in the form of a circle having the center as the first point and a radius as the second point.

In another example, the area may also be defined by a pair of parallel lines passing through the first and second points. However, for the convenience of description and better understanding of the present invention, it is assumed that the defined area is configured in the form of a rectangle.

Although the first and second points and the defined area 230 are visually denoted for better understanding of FIG. 2C, the first and second points or the area 230 may be virtually denoted on the touch-screen 120.

If the defined area 230 is established, icons (i.e., "Music 3" icon, "Music 4" icon, and "Music 5" icon) contained in the area 230 are selected at step S340. The selected icons may be processed in different ways according to the user's selection of the terminal functions.

Figure 2D:
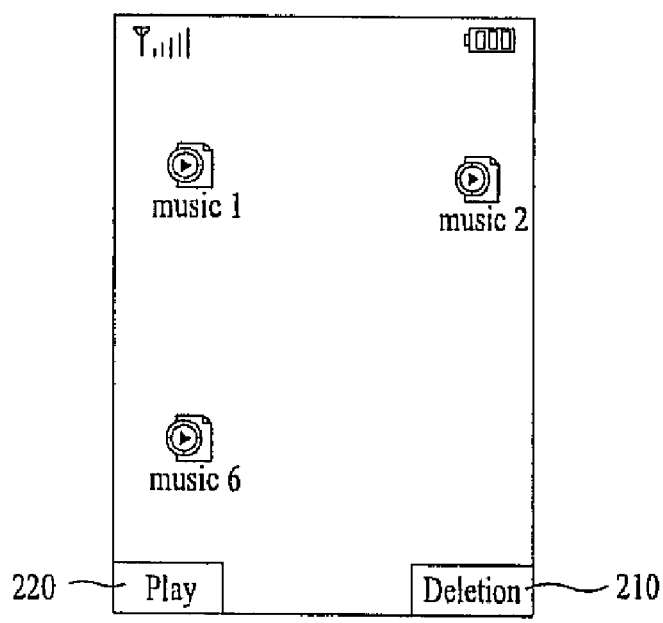

For example, as shown in FIGS. 2C and 2D, the selected icons may be deleted by a Deletion icon 210 pressed by the user, or may be sequentially played by a Play icon 220 pressed by the user.

Likewise, if the user simultaneously performs the first and second touches on the touch-screen 120, a plurality of items can be simultaneously selected/processed, resulting in greater convenience of the user.

As can be seen from FIG. 2B, the user simultaneously performs several touches using his or her fingers. However, it should be noted that the user may also touch a plurality of points of the touch-screen using a plurality of stylus pens. The operations may also be applied to the remaining embodiments other than the first embodiment.

The first embodiment has disclosed the specific case where the user performs two touches on the touch-screen. However, the touching performance is not limited to the two touches, and may also be three or more touchings as necessary. The operations may also be applied to the remaining embodiments other than the first embodiment.

For example, if the user performs three-touching actions, a triangular-shaped area corresponding to three touching points may be established.

A second embodiment of the present invention will be described with reference to FIGS. 4A~4D, and 5. FIGS. 4A~4D show display images of a mobile terminal associated with an item selection method according to a second embodiment of the present invention. FIG. 5 is a flow chart illustrating an item selection method according to a second embodiment of the present invention.

Figure 4A:
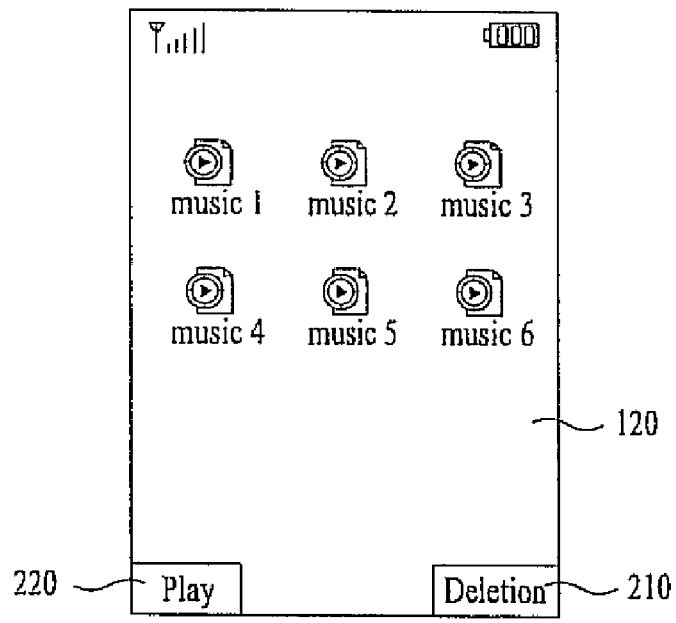
FIGS. 4A~4D show display images of a mobile terminal associated with an item selection method according to a second embodiment of the present invention.
Figure 5:
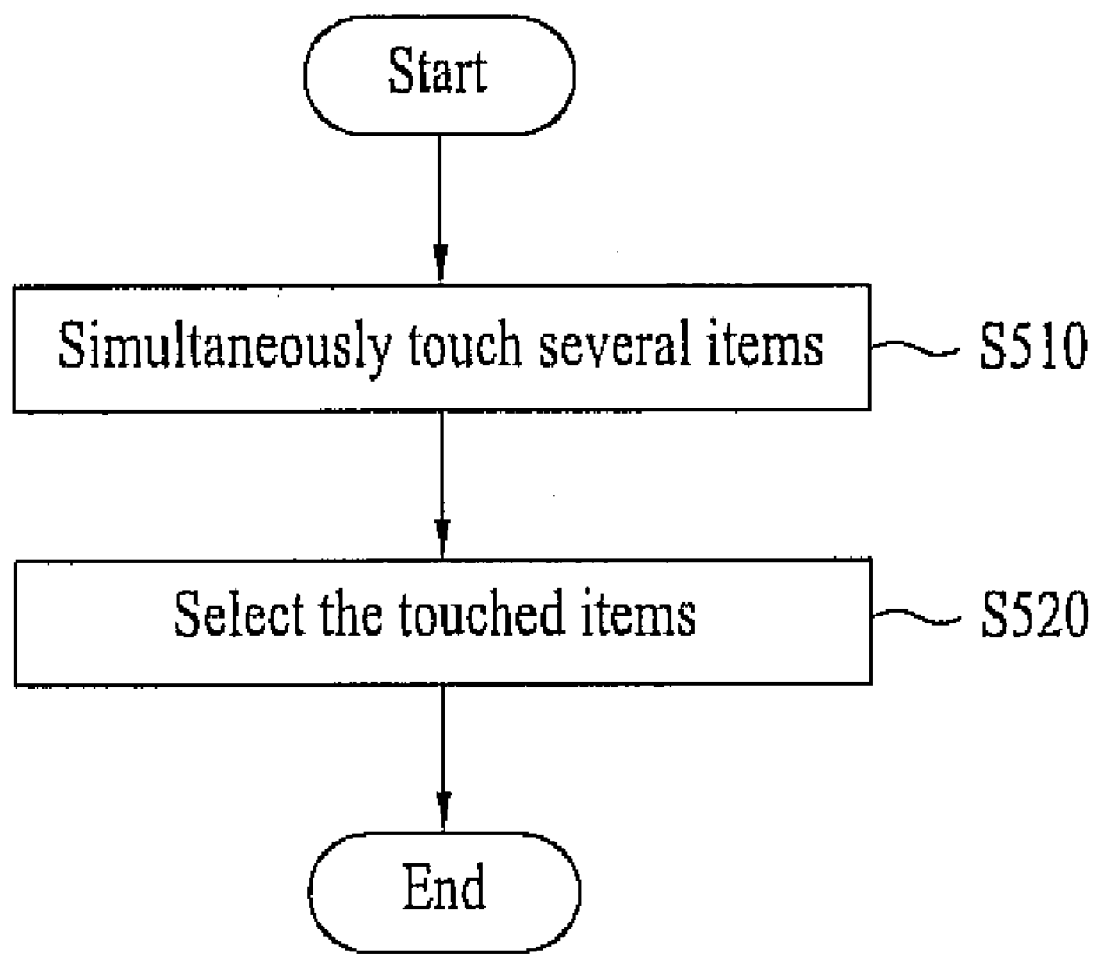
FIG. 5 is a flow chart illustrating an item selection method according to a second embodiment of the present invention.

A method for conveniently selecting a few icons (i.e., "Music 3" icon, and "Music 4" icon) from among the icons according to the second embodiment of the present invention while the MP3 music file icons are displayed as shown in FIG. 4A will be described.

Figure 4B:
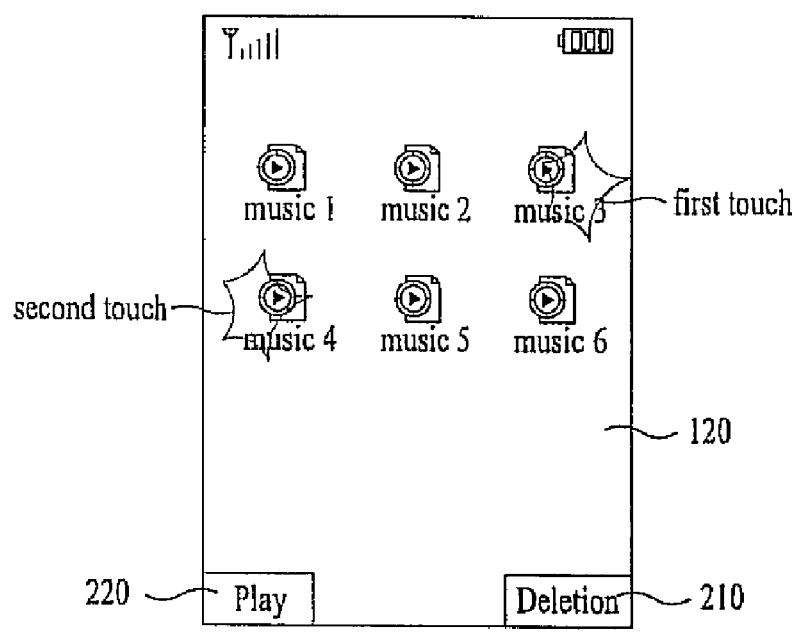
Figure 4C:
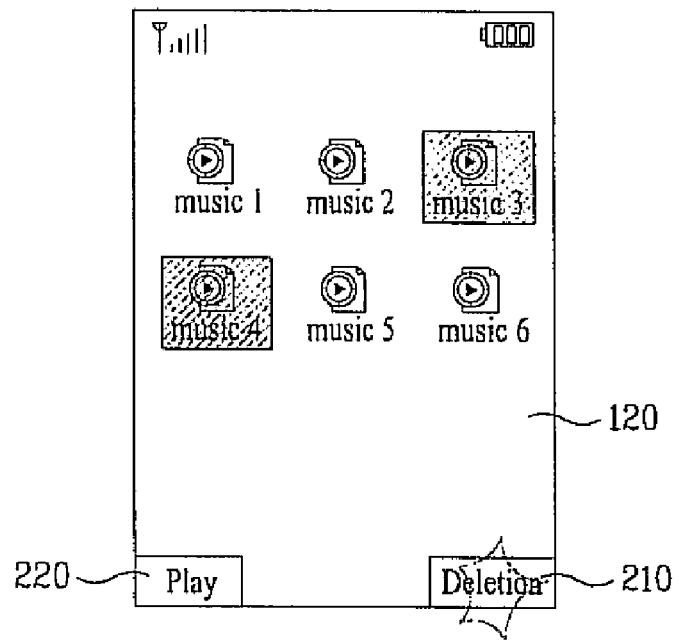

In FIGS. 4A and 4B, the user simultaneously touches two or more icons on the touch-screen 120 of the display at step S510. Although FIG. 4B shows only two icons touched by the user for the convenience of description, it should be noted that the second embodiment can also be applied to other cases where three or more icons are simultaneously touched by the user. As a result, the simultaneously-touched two or more icons are selected at the same time as shown in FIG. 4C at step S520.

Figure 4D:
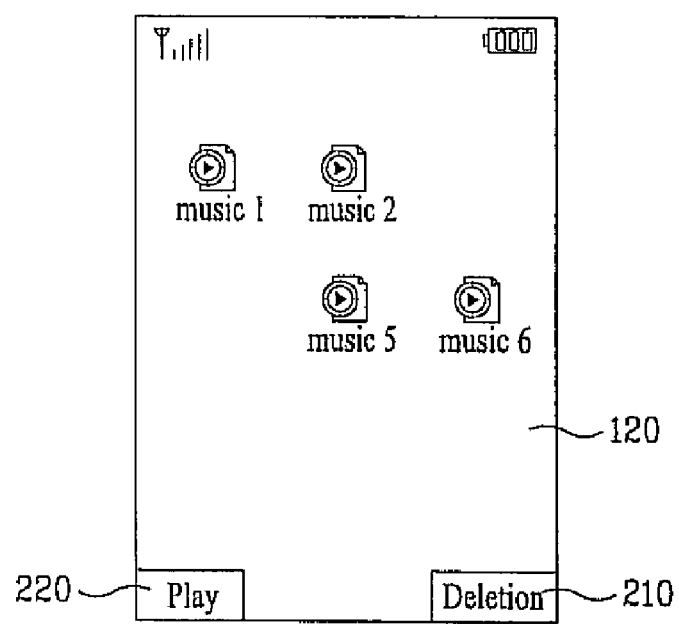

The selected icons can be simultaneously processed according to the user's selection and a plurality of functions of the terminal. For example, the selected icons may be simultaneously deleted by the Deletion icon 210 pressed by the user, as shown in FIGS. 4C~4D.

A third embodiment of the present invention will be described with reference to FIGS. 6A~6D, and 7. FIGS. 6A~6D show display images of a mobile terminal associated with an item selection method according to the third embodiment of the present invention. FIG. 7 is a flow chart illustrating an item selection method according to a third embodiment of the present invention.

Figure 6A:
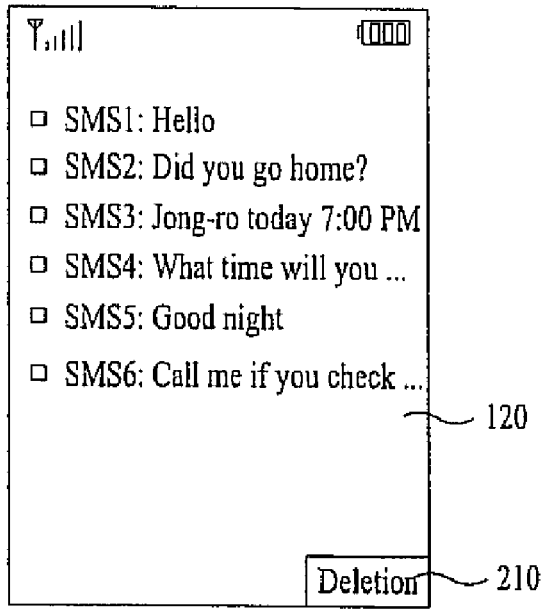
FIGS. 6A~6D show display images of a mobile terminal associated with an item selection method according to a third embodiment of the present invention.
Figure 7:
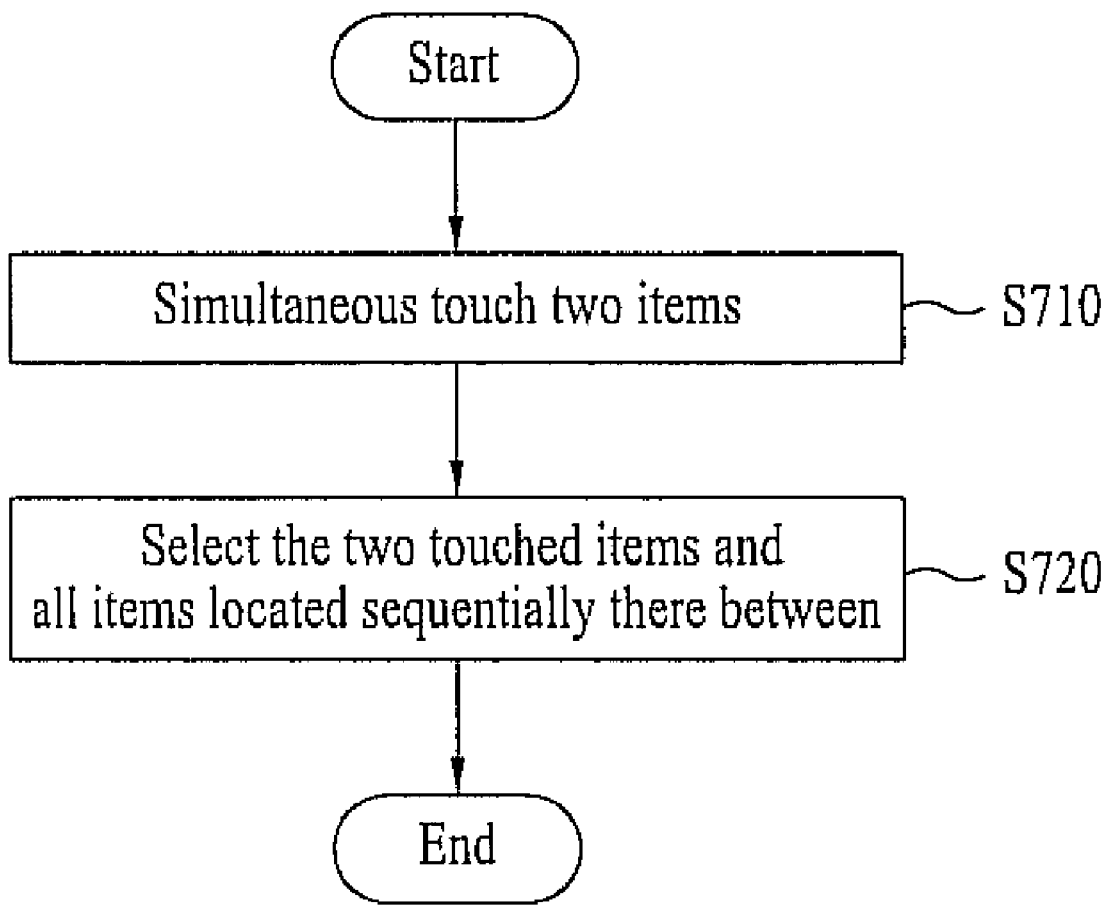
FIG. 7 is a flow chart illustrating an item selection method according to a third embodiment of the present invention.

If the SMS reception list is displayed as shown in FIG. 6A, a method for conveniently selecting some icons (e.g., "SMS3" icon, "SMS4" icon, "SMS5" icon, "SMS6" icon) from among the displayed list according to the third embodiment of the present invention will be described.

Figure 6B:
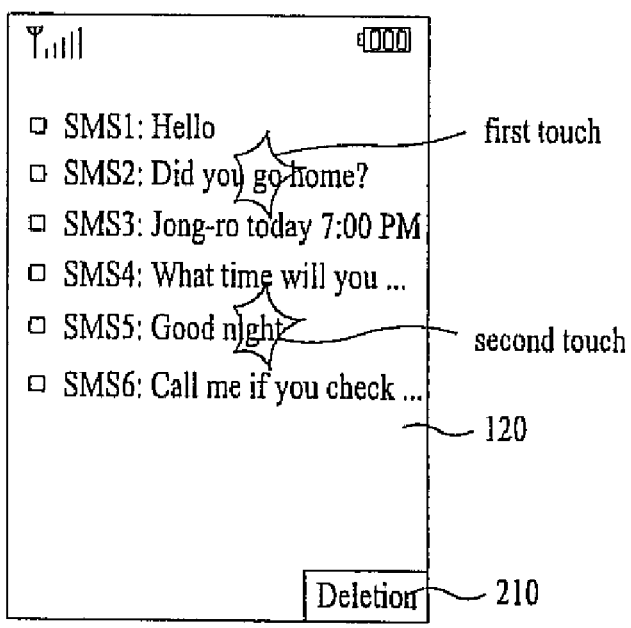

Under the SMS display situation of FIG. 6A, the user simultaneously touches the "SMS2" and "SMS5" icons on the touch-screen as shown in FIG. 6B at step S710.

Figure 6C:
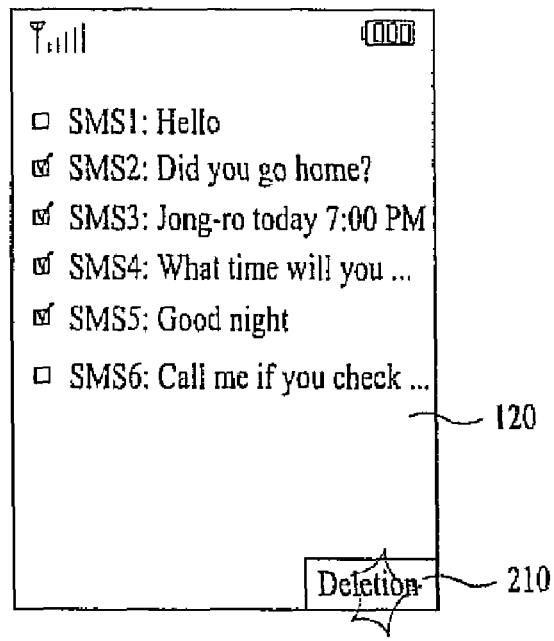

If the "SMS3" icon and the "SMS6" icon are simultaneously touched by the first touch and second touch, respectively, not only the "SMS2" and "SMS5" icons, but also the "SMS3" and "SMS4" icons are simultaneously selected as shown in FIG. 6C at step S720.

Figure 6D:
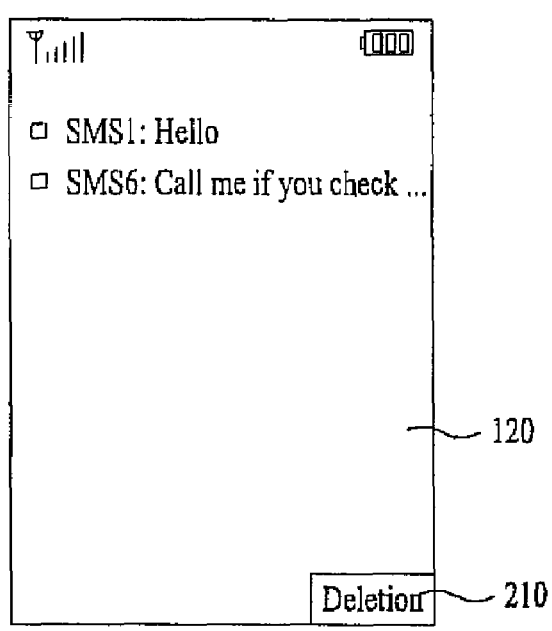

The selected SMS icons may be processed in different ways according to the user's selection and a variety of functions of the terminal. For example, all the icons (i.e., "SMS3" icon, "SMS4" icon, "SMS5" icon, and "SMS6" icon) can be simultaneously deleted by the Deletion icon 210 pressed by the user, as shown in FIGS. 6C~6D.

Although the third embodiment has disclosed the SMS list, it should be noted that the present invention is not limited to the above-mentioned example, and may also be applied to phone-number and mail lists.

In addition, the third embodiment has disclosed a plurality of vertically-displayed items, it should be noted that the items may also be sequentially displayed in any direction.

In the meantime, if the user simultaneously touches the "SMS2" icon and the "SMS5" icon under the display situation of FIG. 6A, the third embodiment may consider that only the "SMS2" and "SMS5" icons have been selected as necessary. The aforementioned operations are similar to those of the second embodiment, such that a detailed description thereof will herein be omitted for the convenience of description.

A fourth embodiment of the present invention will hereinafter be described with reference to FIGS. 8A~8D, and 9. FIGS. 8A~8D exemplarily show display images of a mobile terminal associated with an item selection method according to a fourth embodiment of the present invention. FIG. 9 is a flow chart illustrating an item selection method according to a fourth embodiment of the present invention.

Figure 8A:
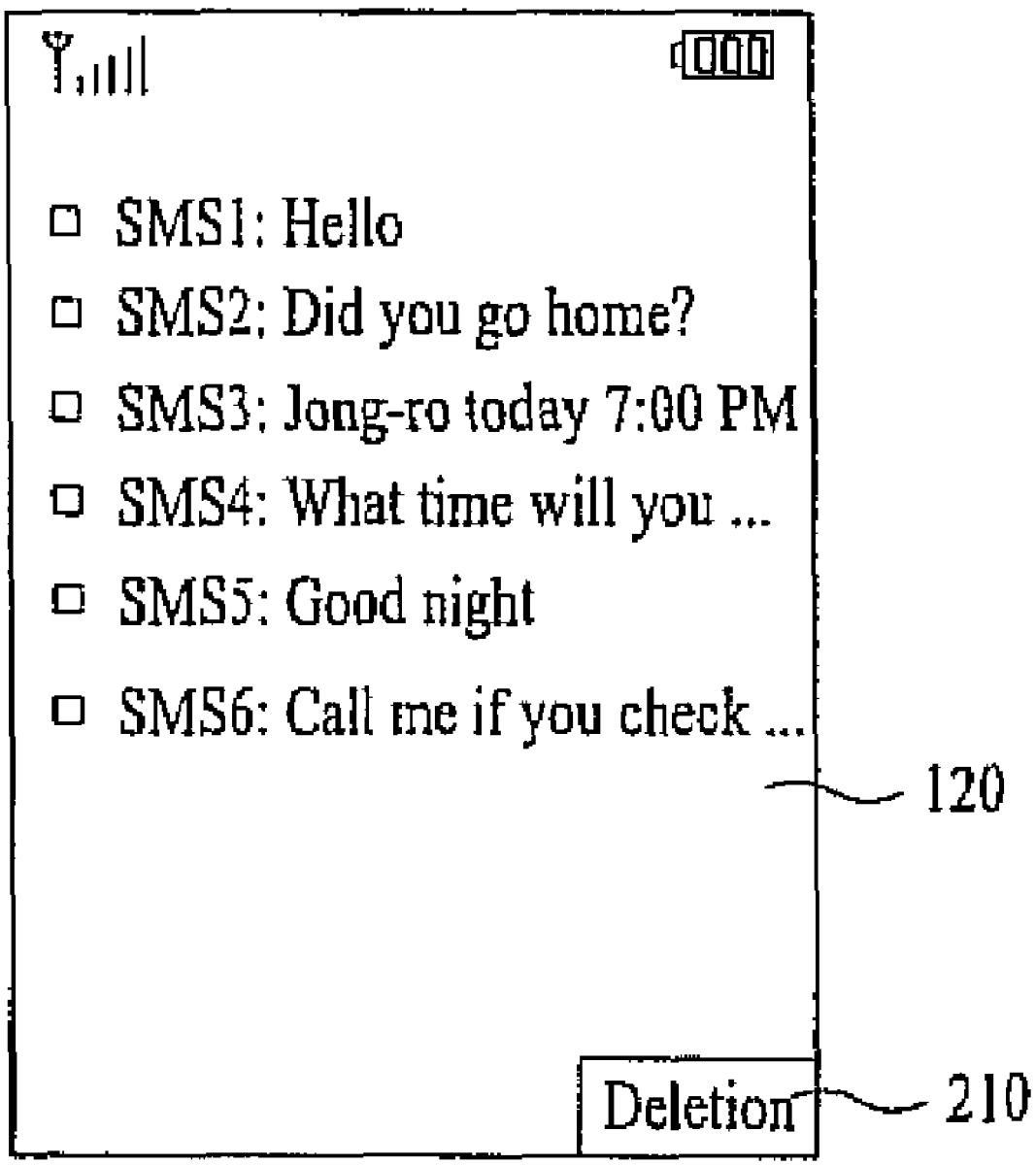
Figure 9:
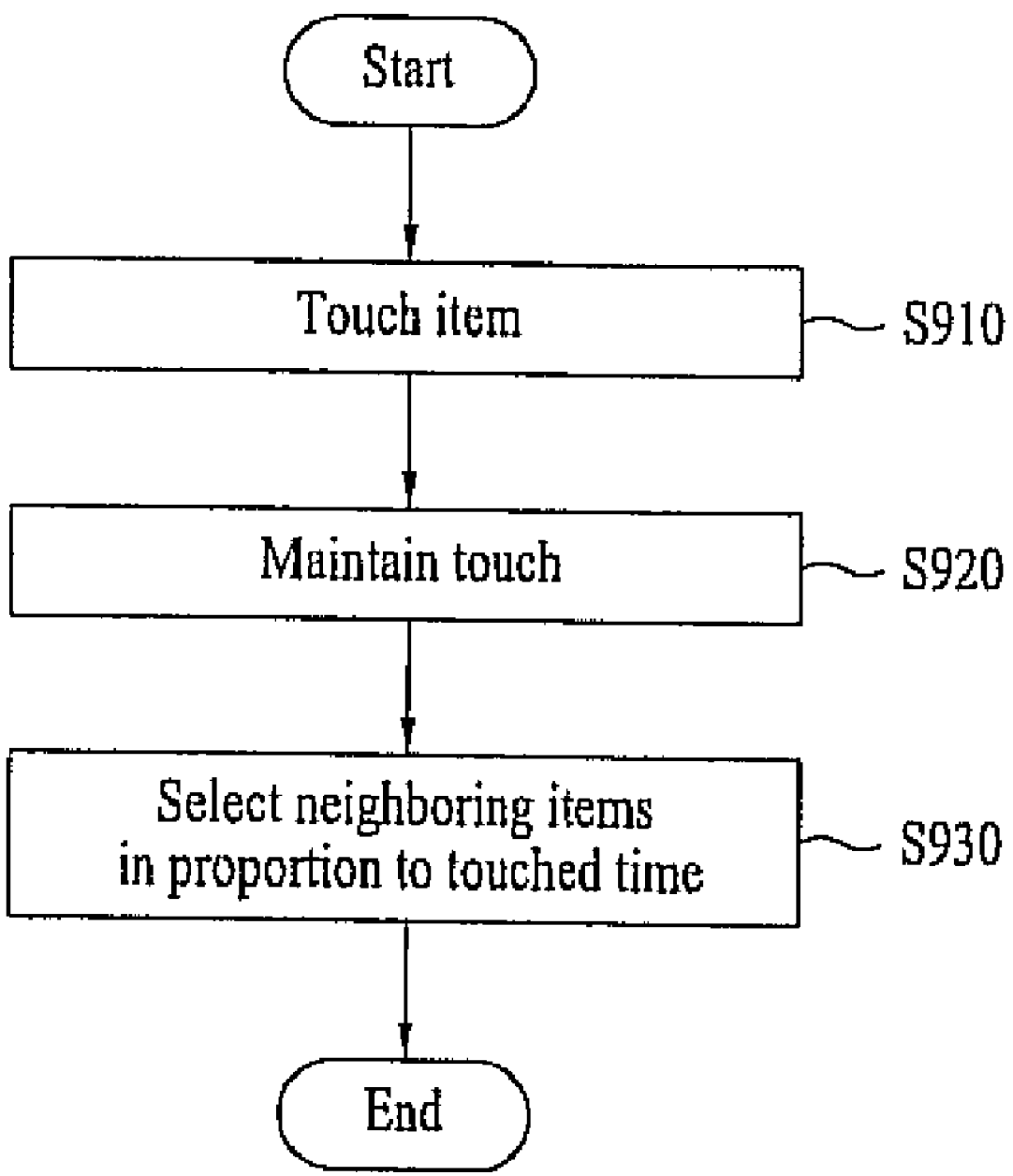
FIG. 9 is a flow chart illustrating an item selection method according to a fourth embodiment of the present invention.

If the SMS reception list is displayed as shown in FIG. 8A, a method for conveniently selecting some icons (e.g., "SMS2" icon, "SMS3" icon, and "SMS4" icon) from among the displayed list according to the fourth embodiment of the present invention will hereinafter be described.

In FIGS. 8A and 8B, the user touches the "SMS2" icon on the touch-screen 120 (8b-1) at step S910. Therefore, the "SMS2" icon is selected as shown in (8b-2) of FIG. 8B. In this case, if the user takes his or her finger off of the touch-screen, only the "SMS2" icon is selected.

However, if the user continuously touches the "SMS2" icon for a predetermined period of time, the "SMS3" icon is also selected as shown in (5b-3) of FIG. 8B. If the user further maintains contact with the "SMS2" icon for another predetermined period of time, the "SMS4" icon is selected as shown in FIG. (8b-4) of FIG. 8B. In this case, if the user takes his or her finger off of the "SMS2" icon of the touch-screen as shown in (8b-5) of FIG. 8B, all of the "SMS2", "SMS3", and "SMS4" icons are completely selected at steps S920 and S930.

Figure 8C:
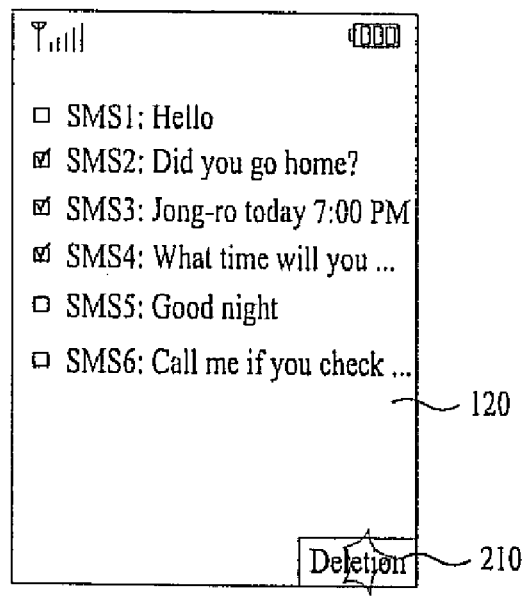
Figure 8D:
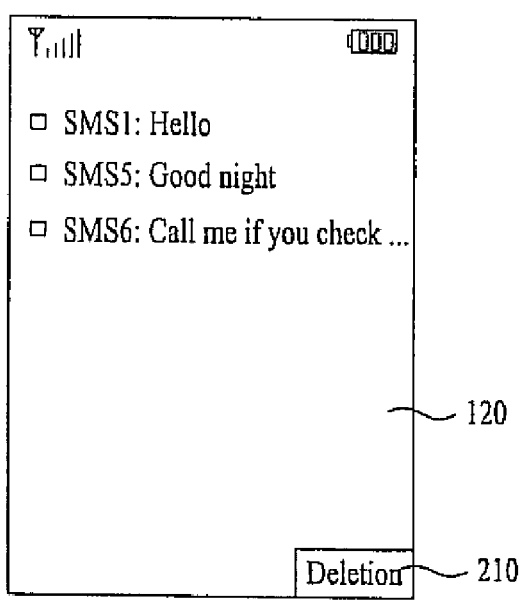

The selected SMS messages may be processed in different ways according to the user's selection and a variety of functions of the terminal. For example, if the user touches the Deletion icon 210 as shown in FIGS. 8C and 8B, all of the "SMS2", "SMS3", and "SMS4" icons may be deleted at the same time.

Although the fourth embodiment discloses the SMS list, it should be noted that the present invention is not limited to this example, and may also be applied to phone-number and E-mail lists.

Although, the fourth embodiment discloses a plurality of vertically-displayed items, it should be noted that the items may also be sequentially displayed in any direction.

The fourth embodiment discloses that if a single item is continuously touched for at least one predetermined period of time, items following the selected single item are sequentially selected. However, it should be noted that the scope of the present invention is not limited to this example, For example, if a single item is continuously touched for at least a predetermined period of time, items prior to the selected single item may be selected in inverse order, or neighboring items (i.e., previous and following items) of the selected item may also be selected as necessary.

A fifth preferred embodiment of the present invention is described with reference to FIGS. 10A~10D, and 11. FIGS. 10A~10D show display images of a mobile terminal associated with an item selection method according to the fifth embodiment of the present invention. FIG. 11 is a flow chart illustrating an item selection method according to the fifth embodiment of the present invention.

Figure 10A:
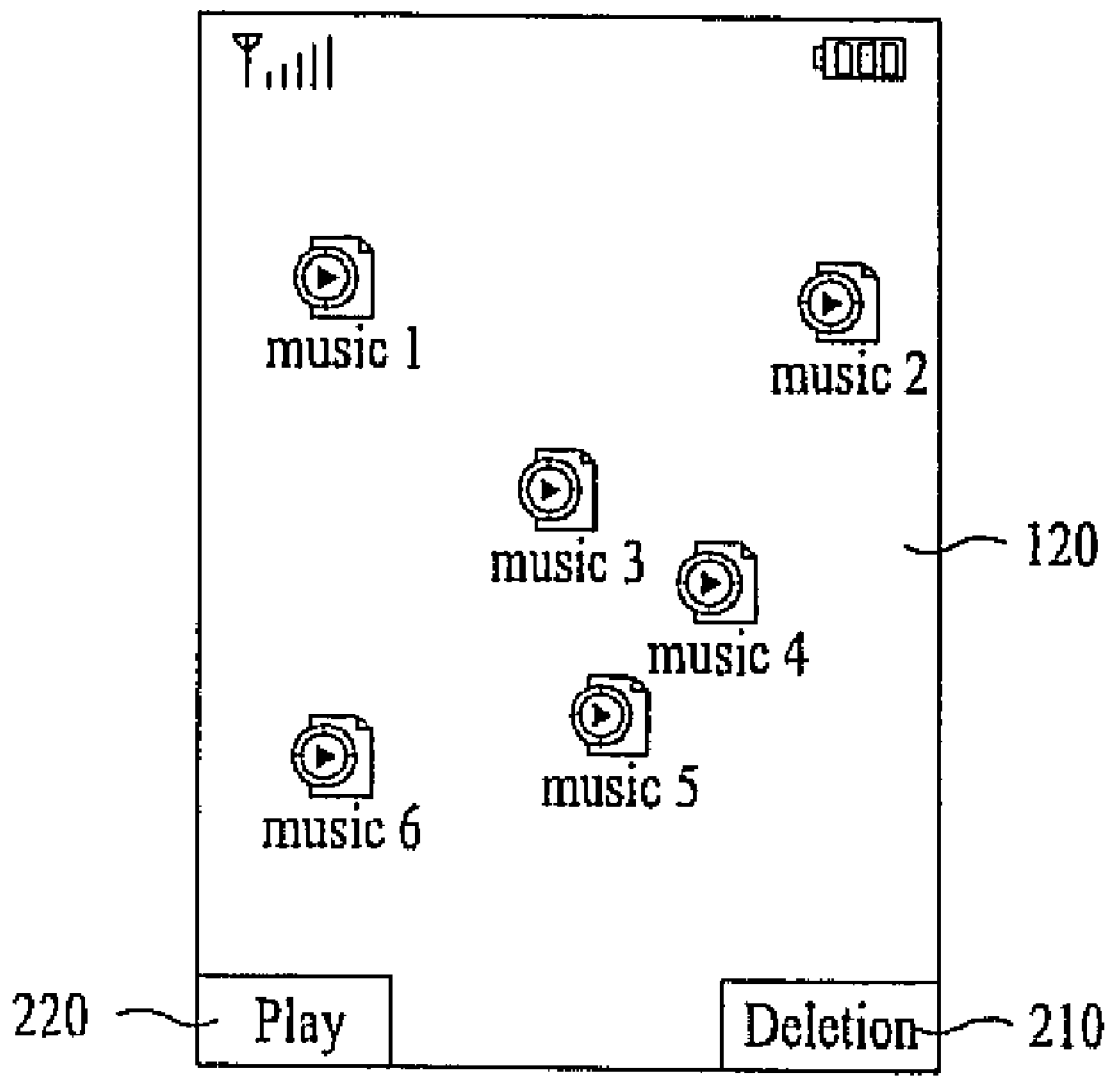
Figure 11:
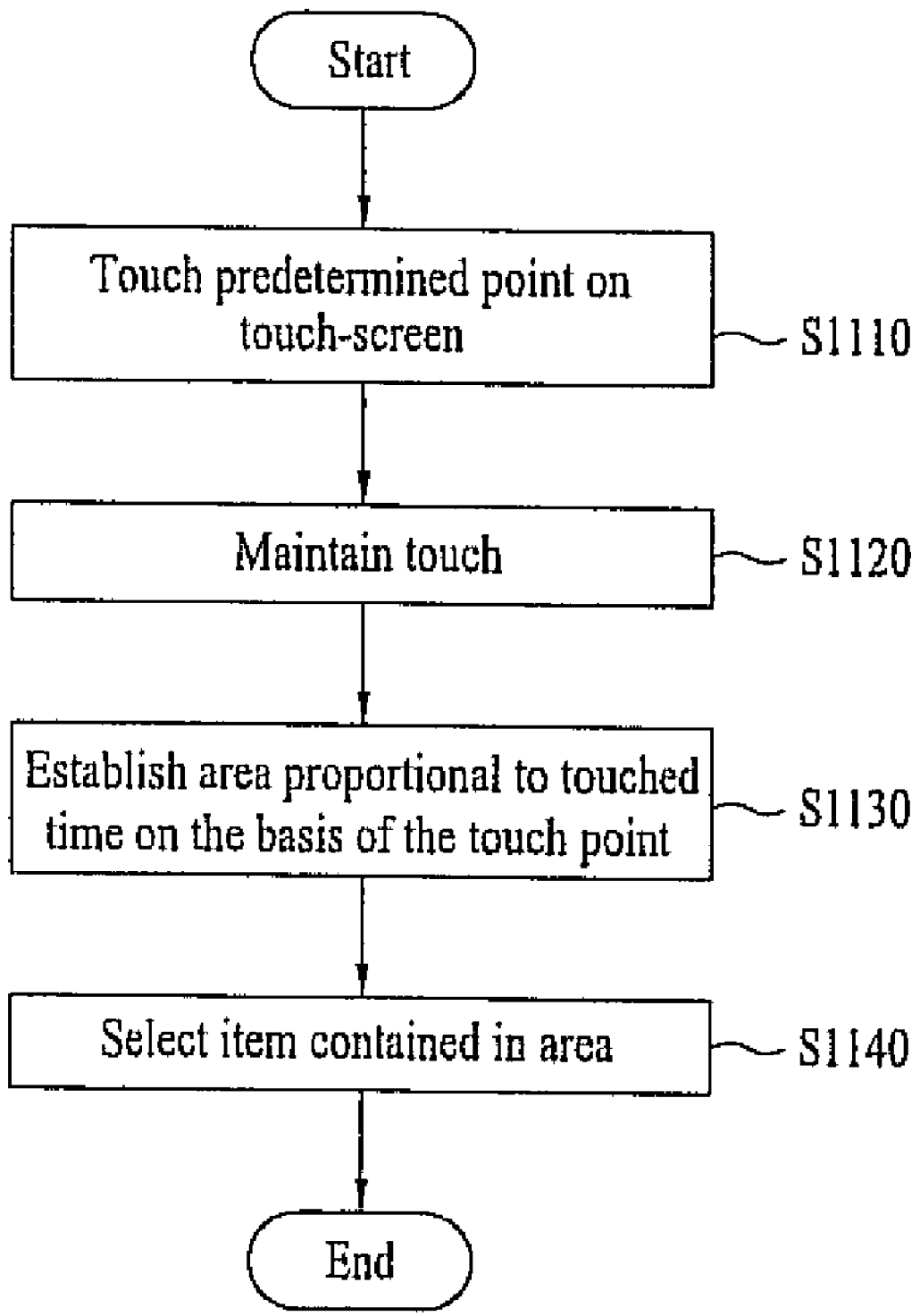
FIG. 11 is a flow chart illustrating an item selection method according to a fifth embodiment of the present invention.

If the MP3 music file icons are displayed as shown in FIG. 10A, a method for conveniently selecting some icons (e.g., "SMS3" icon, "SMS4" icon, and "SMS5" icon) from among the displayed list according to the fifth embodiment of the present invention will be described.

Under the icon display situation of FIG. 10A, the user touches a predetermined point on the touch-screen 120 as shown in (10b-1) of FIG. 10B at step S1110, and maintains the point-touching state for a predetermined period of time at step S1120.

A closed-curve area 230 is formed on the basis of the point shown in (10b-2) of FIG. 10B at step S1130. Although FIG. 10B shows the circular-shaped area 230, it should be noted that the present invention is not limited to this example.

Although the area 230 has been visually denoted for better understanding of FIG. 10B, the area 230 may also be virtually denoted on the touch-screen 120 as necessary.

If the user continuously touches the area 230 for a predetermined period of time as shown in (10b-3) of FIG. 10B, the size of the area 230 becomes larger such that the area 230 is able to include the "Music 3", "Music 4", and "Music 5" icons.

In this case, if the user takes his or her finger off of the touch-screen as shown in (10b-4) of FIG. 10B, all of the "Music 3", "Music 4", and "Music 5" icons are completely selected at step S1140.

Figure 10C:
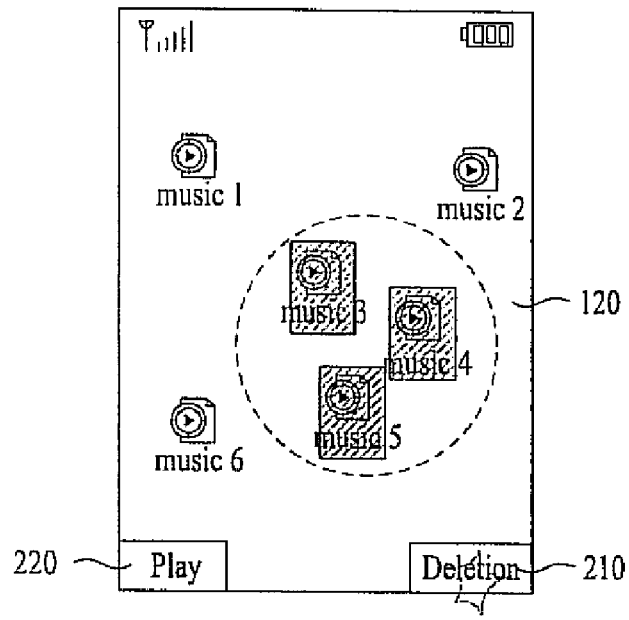
Figure 10D:
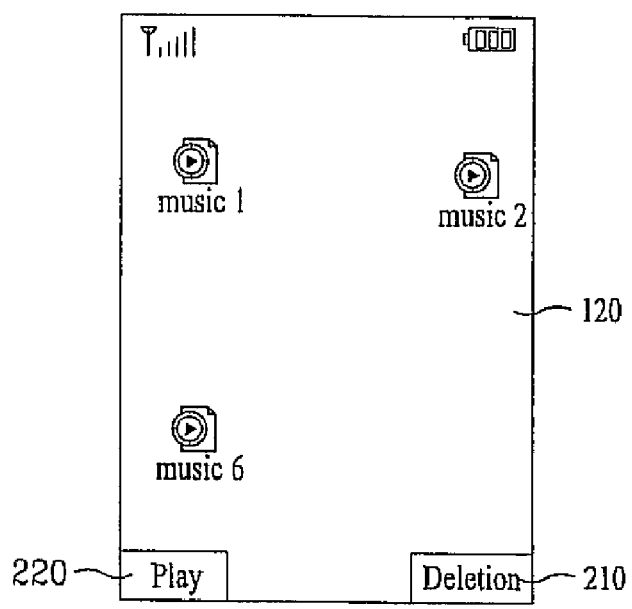

In this way, the selected icons may be processed in different ways according to the user's selection and a variety of functions of the terminal. For example, if the user selects on the Deletion icon 210 as shown in FIGS. 10C and 10D, all of the "Music 3", "Music 4", and "Music 5" may simultaneously be deleted as necessary.

The item selection method and the terminal for implementing the same according to the present invention have the following effects.

As apparent from the above description, the item selection method and the terminal for implementing the same according to the present invention can allow a user to conveniently and simultaneously select a plurality of desired items from among many items displayed on the screen.

In recent times, with the increasing development of convergence capable of providing a user with a variety of functions via a single terminal, the present invention can be conveniently applied to the latest terminal where a plurality of associated items are simultaneously displayed on a single display screen of the terminal.

Although the present invention has disclosed the display configured in the form of a touch-screen, it should be noted that the scope of the present invention is not limited to the this example and can be applied to other examples as necessary. For example, it is obvious to those skilled in the art that the present invention can also be applied to a non-touchscreen-type terminal equipped with a touch-pad substituting for the touch-screen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for selecting items displayed on a display, the method comprising:
   selecting a point on the display for a period of time;
   enlarging a selection area on the display, the selection area being centered about the point and enlarged in proportion to the period of time; and
   selecting items located in the selection area,
   wherein only the selection area is enlarged during the period of time.

2. The method according to claim 1, wherein:
   the display is a touch-screen, and the selecting the point is performed when the point is touched by a user of a terminal for the period of time.

3. The method according to claim 1, wherein the selection area is virtually formed on the display.

4. The method according to claim 1, wherein the selection area is defined by a closed curve enclosing the point.

5. The method according to claim 4, wherein the closed curve is a circle.

6. A terminal comprising:
an input unit;
a display for displaying items; and
a controller for enlarging a selection area of the display, the selection area being centered about a point and enlarged in proportion to a period of time when the point of the display is touched for the period of time, and for controlling items located in the selection area,
wherein only the selection area is enlarged during the period of time.

7. The terminal according to claim 6, wherein the input unit and the display are implemented with a touch-screen.

8. The terminal according to claim 6, wherein the selection area is virtually formed on the display.

9. The terminal according to claim 6, wherein the selection area is defined by a closed curve enclosing the point.

10. The terminal according to claim 6, wherein the closed curve is a circle.

11. A method for selecting items displayed on a touch screen, the method comprising:
touching an item displayed on the touch screen for a period of time; and
sequentially selecting the touched item and items adjacent to the touched item in proportion to the period of time,
wherein the selected items are not enlarged during the period of time.

12. A terminal comprising:
a touch-screen for displaying a plurality of items; and
a controller for sequentially selecting a touched item and neighboring items of the touched item in proportion to a period of time for which the item is touched,
wherein the selected items are not enlarged during the period of time.

* * * * *